(12) United States Patent
Nakano et al.

(10) Patent No.: US 11,927,161 B2
(45) Date of Patent: Mar. 12, 2024

(54) VEHICLE

(71) Applicant: HONDA MOTOR CO., LTD., Tokyo (JP)

(72) Inventors: Junichi Nakano, Tokyo (JP); Makoto Hotozuka, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/119,374

(22) Filed: Mar. 9, 2023

(65) Prior Publication Data

US 2023/0313768 A1    Oct. 5, 2023

(30) Foreign Application Priority Data

Mar. 31, 2022    (JP) .................................. 2022-060938

(51) Int. Cl.
*F02M 35/16* (2006.01)
*B60K 13/02* (2006.01)
*F02M 35/02* (2006.01)

(52) U.S. Cl.
CPC ........... *F02M 35/161* (2013.01); *B60K 13/02* (2013.01); *F02M 35/0201* (2013.01)

(58) Field of Classification Search
CPC .. F02M 35/161; F02M 35/0201; B60K 13/02; B60K 5/00
See application file for complete search history.

(56) References Cited

U.S. PATENT DOCUMENTS

| | | | |
|---|---|---|---|
| 11,092,229 B2 | 8/2021 | Matsudo | |
| 2014/0374179 A1* | 12/2014 | Deckard | B60K 13/06 180/68.3 |
| 2015/0375614 A1* | 12/2015 | Osaki | F02M 35/162 296/184.1 |
| 2020/0088142 A1* | 3/2020 | Tanaka | F02M 35/10288 |

FOREIGN PATENT DOCUMENTS

JP    2020-108976 A    7/2020

* cited by examiner

*Primary Examiner* — Syed O Hasan
(74) *Attorney, Agent, or Firm* — Carrier, Shende & Associates P.C.; Fulchand P. Shende; Joseph P. Carrier

(57) ABSTRACT

A vehicle includes an engine main body positioned behind a seat and at least partially in the center of the vehicle width direction; a first air cleaner positioned above the engine main body so as to define and form a part of an intake passage of the internal combustion engine; and a second air cleaner disposed upstream of the first air cleaner so as to define and form a part of the intake passage, in which the second air cleaner is positioned outside the first air cleaner in the vehicle width direction. This configuration can relatively shorten the length of an intake passage including an air cleaner in vehicles, including vehicles that are frequently used on rough terrain.

10 Claims, 10 Drawing Sheets

VEHICLE

TECHNICAL FIELD

The present invention relates to a vehicle having three or more wheels including front and rear wheels, and relates to a vehicle capable of traveling on rough terrain, such as a multi-utility vehicle (MUV) used even in a large inclined state.

BACKGROUND ART

Patent Document 1 discloses an example of a vehicle that is frequently used on rough terrain, referred to as an all-terrain vehicle (ATV) or side-by-side vehicle. The vehicle of Patent Document 1 has left and right front wheels and left and right rear wheels, and has left and right front seats and left and right rear seats. A dashboard is disposed in front of the front seat, and the area covered by the front cover in front of the dashboard is defined as a front area. The engine of an engine unit is disposed near the center of a vehicle body in the front-rear direction, and an intake duct connected to a cylinder portion of the engine is connected to an air cleaner. The intake duct has a first tube portion extending in the front-rear direction and a second tube portion connected to the front of the first tube portion and extending in the vertical direction, thus disposing the air cleaner in the front area. The air cleaner has an intake port at the top of it for sucking outside air, and the intake port is opened to the right. By opening the intake port in the direction orthogonal to the traveling direction of the vehicle in this manner, the possibility of drawing dust or the like from the intake port during traveling of the vehicle is reduced.

PRIOR ART DOCUMENT

Patent Document

Patent Document 1: JP 2020-108976 A

SUMMARY OF THE INVENTION

Underlying Problems to be Solved by the Invention

In the configuration of the vehicle in Patent Document 1, the air cleaner is disposed in the front area as described above, so the length of the intake passage connecting the air cleaner and the cylinder portion, that is, the engine main body of the internal combustion engine, is long related to the size of the vehicle, which increases the cost of the intake pipes and others that defining and forming the intake passage portion. Therefore, an object of the present invention is to provide a configuration that can relatively shorten the length of the intake passage where an air cleaner is disposed, for internal combustion engines of vehicles including vehicles that are frequently used on rough terrain.

Means to Solve the Problems

In order to achieve the above object, one aspect of the present invention is a vehicle including an internal combustion engine, including:
  an engine main body positioned behind a seat and at least partially in the center of the vehicle width direction;
  a first air cleaner positioned above the engine main body so as to define and form a part of an intake passage of the internal combustion engine; and
  a second air cleaner positioned upstream of the first air cleaner so as to define and form a part of the intake passage,
  in which the second air cleaner is positioned outside the first air cleaner in the vehicle width direction.

The above configuration can shorten the length of the intake pipe member extending between the first air cleaner and the engine main body, thus relatively shortening the length of the intake passage of the internal combustion engine, compared to the case where the air cleaner is disposed in the front area in front of the dashboard in front of the front seat as in the vehicle in Patent Document 1.

Preferably, the vehicle includes a frame constituting the outer frame of the vehicle, and the second air cleaner is disposed inside the frame and in the vicinity of a side surface portion of the vehicle. This configuration improves accessibility to the second air cleaner and enhances the workability of its maintenance.

Preferably, the intake pipe member is connected to the upstream side of the second air cleaner, and the intake pipe member extends outside of the second air cleaner in the vehicle width direction. This configuration allows intake air to be suitably directed to the second air cleaner even when the second air cleaner is disposed relatively inside the vehicle.

Preferably, the first air cleaner is further covered by a case member. This configuration reduces the degree to which the first air cleaner and the intake air passing through it are affected by the heat of the engine main body, even when the first air cleaner is disposed near the engine main body.

Preferably, at least a part of the second air cleaner overlaps with the first air cleaner in the front-rear direction of the vehicle. This configuration allows the first and second air cleaners to be compactly disposed in a small space behind the seat.

Preferably, the vehicle further includes a accommodating portion provided behind the seat and a reinforcing frame portion positioned between the accommodating portion and the seat in the vehicle front-rear direction, and at least a part of the first air cleaner and the second air cleaner should overlap with the reinforcing frame portion in the front-rear direction of the vehicle. This configuration allows the first air cleaner and the second air cleaner to be compactly disposed in a small space behind the seat and in front of the accommodating portion.

Preferably, the reinforcing frame portion includes a roll bar frame member. The use of the roll bar frame members allows more easy reinforcement of the vehicle and further reduces the space required for the reinforcing frame portion.

Preferably, the first air cleaner has a clean side and a dirty side partitioned by an air cleaner element, the dirty side facing the side surface portion of the vehicle. This configuration improves accessibility to the dirty side portion of the first air cleaner and enhances the workability of its maintenance. This contributes to further improving the workability of maintenance of the first air cleaner when the first air cleaner has a configuration where the dirty side portion can be removed from the first air cleaner.

Preferably, at least one of a first intake pipe connecting the engine main body and the first air cleaner and a second intake pipe connecting the first air cleaner and the second air cleaner includes a bellows-shaped pipe portion. This configuration makes it easier to accommodate a more flexible arrangement of one or both of the first and second air cleaners. This configuration also suppresses transmission of vibrations of the engine main body to the first and second air cleaners.

Preferably, the second air cleaner is configured integrally with the first air cleaner. This configuration reduces the number of parts and parts cost.

Effects of the Invention

According to the aspect of the present invention, the above configuration makes it possible to relatively shorten the length of the intake passage in which the air cleaner is disposed in the internal combustion engine of a vehicle.

MODES FOR CARRYING OUT THE INVENTION

Figure 1:
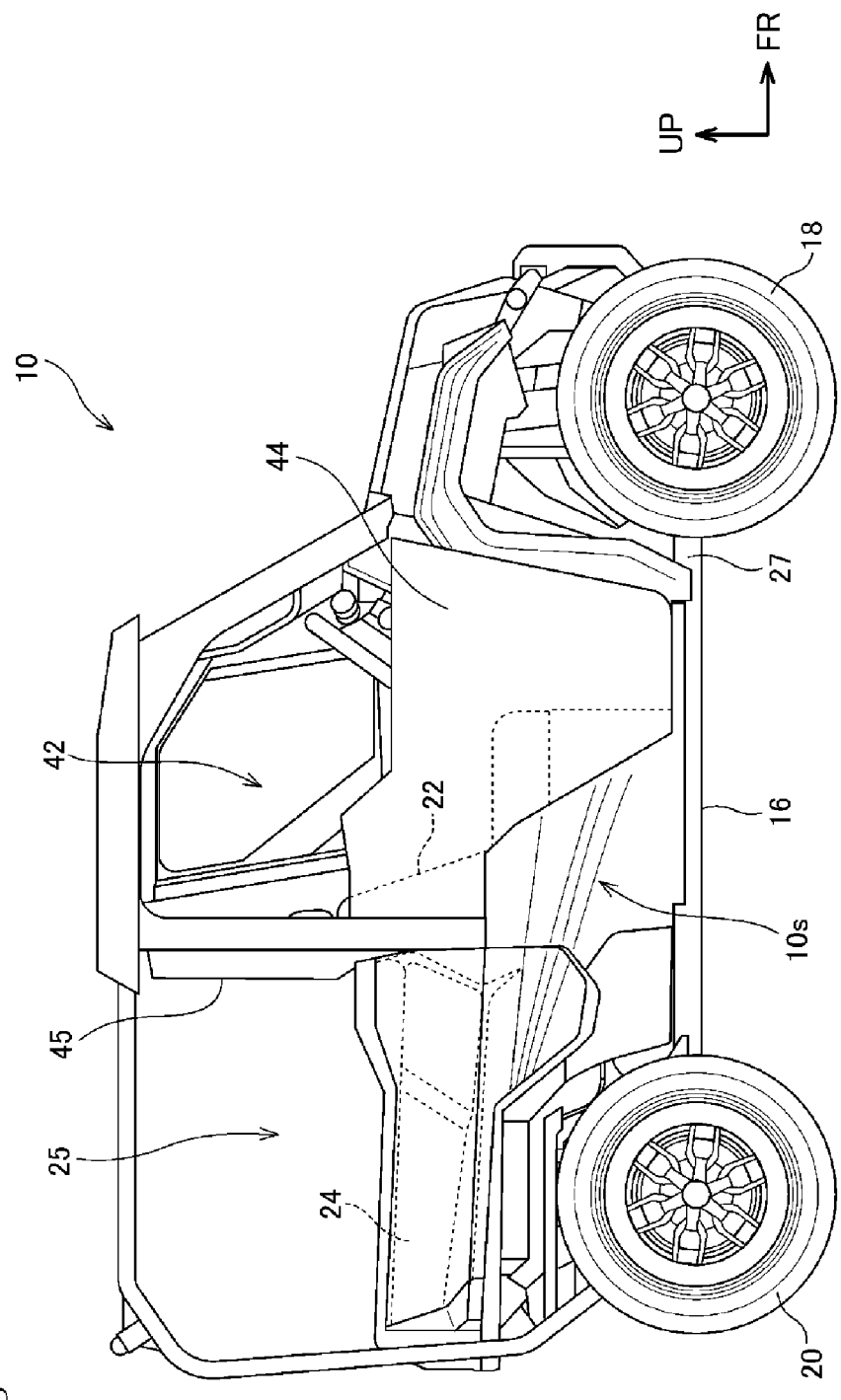
FIG. 1 is a right side view of a vehicle according to a first embodiment of the present invention.

Hereinafter, embodiments according to the present invention will be described with reference to the accompanying drawings. Identical parts (or configurations) are marked with identical reference numerals, and their names and functions are also identical. Therefore, detailed description thereof will not be repeated.

Figure 2:
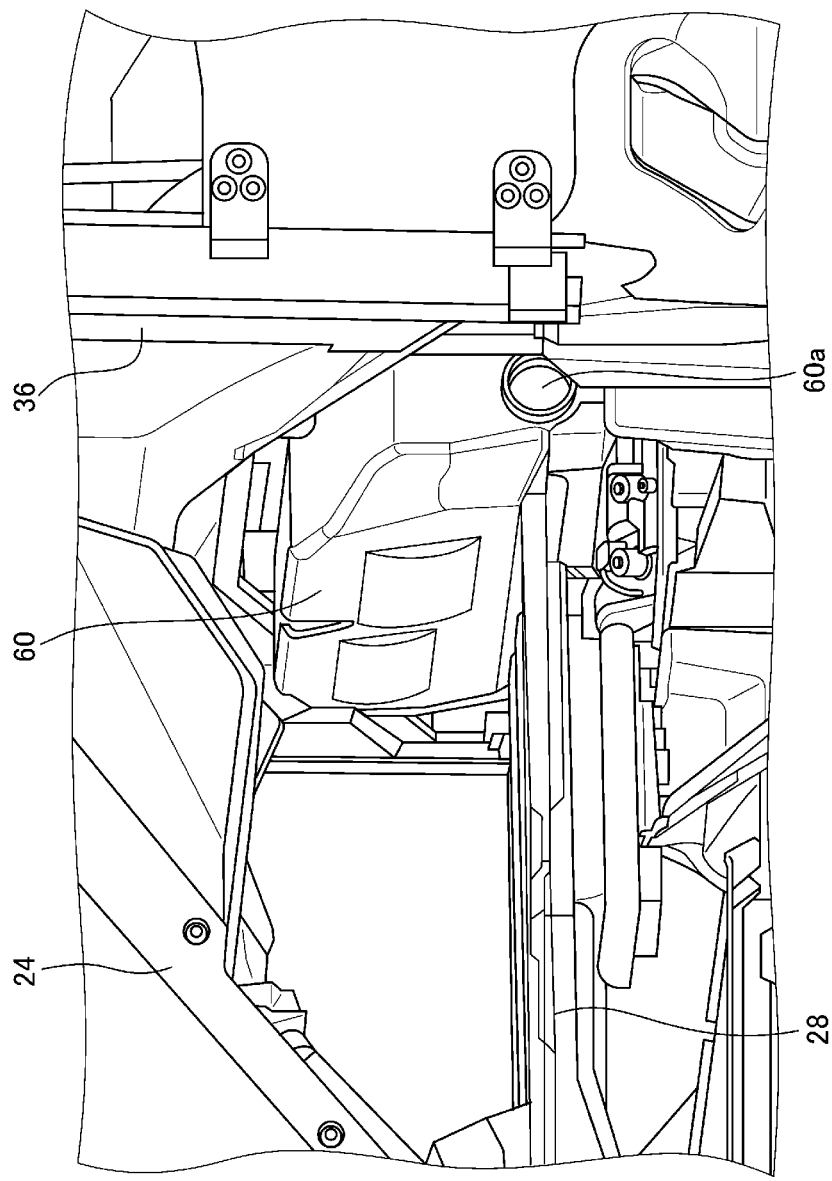
FIG. 2 is a perspective view of an intermediate portion of the vehicle in the front-rear direction in FIG. 1 as viewed from behind and to the right of the portion.
Figure 3:
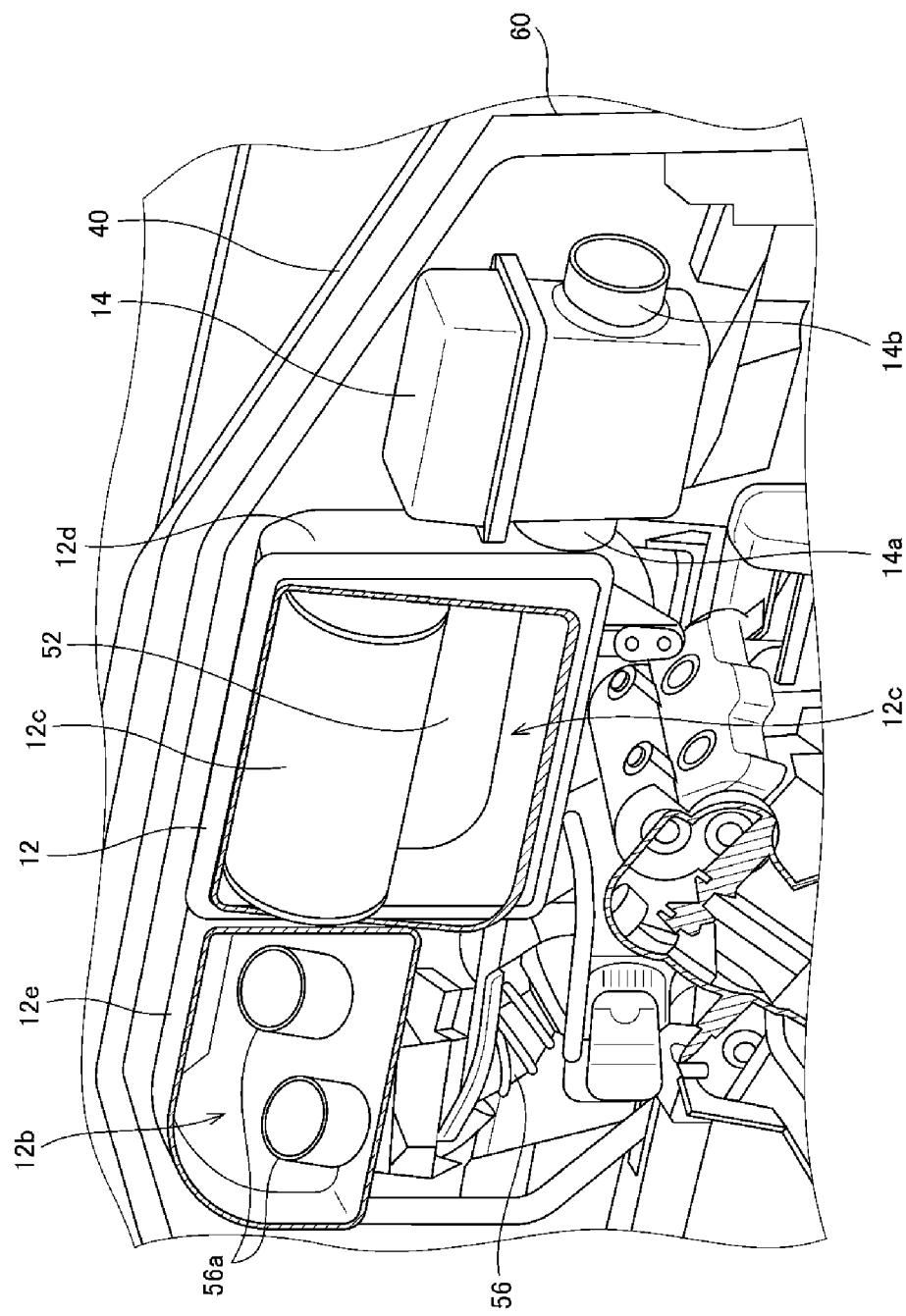
FIG. 3 is a perspective view of a cross section of an intermediate portion from which a cover member is removed and a periphery thereof in the vehicle of FIG. 1 as viewed from behind and to the right of the portion.
Figure 4:
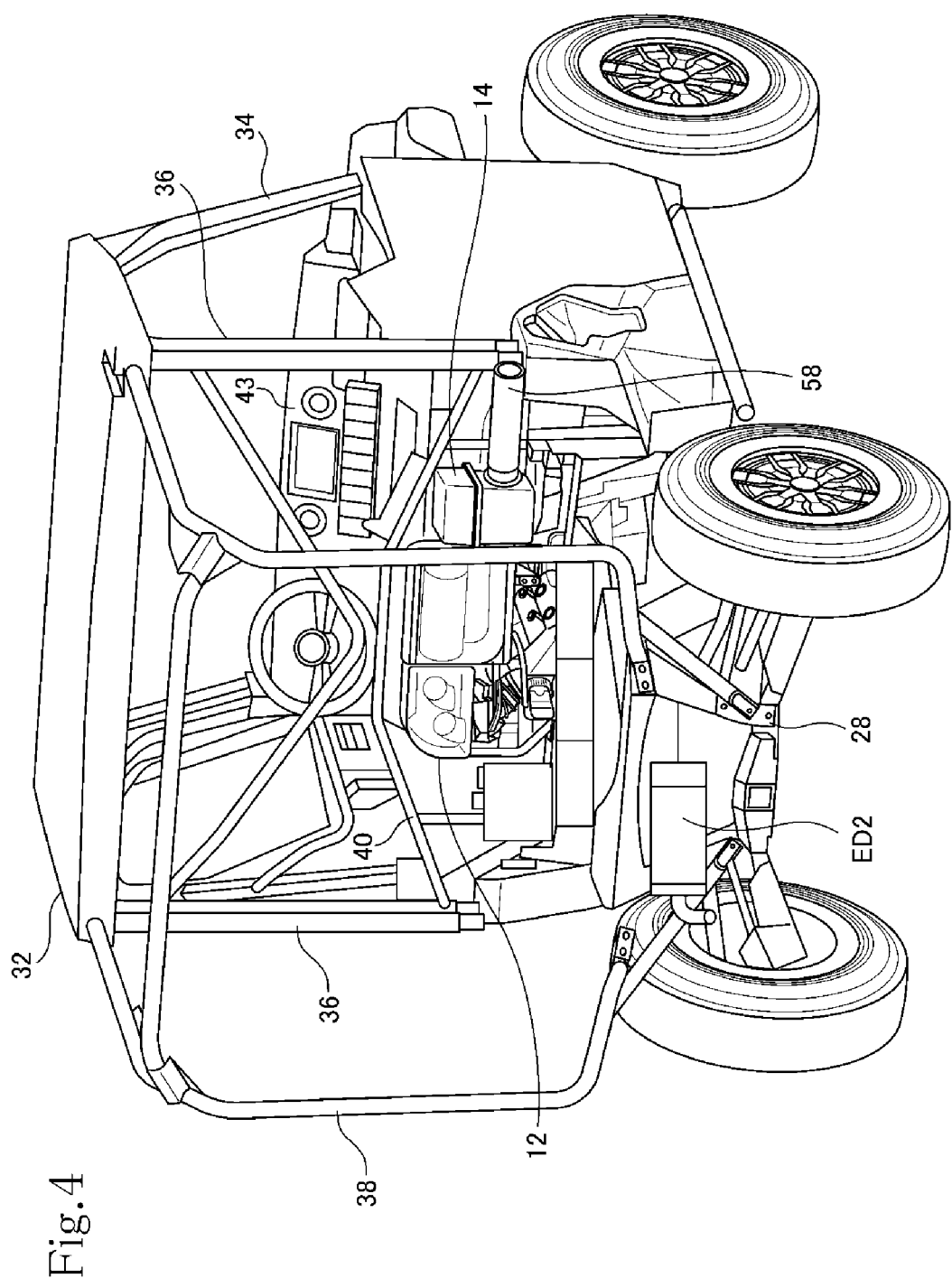
FIG. 4 is a perspective view of the surroundings of the air cleaners illustrated in FIG. 3, mainly with respect to the vehicle body frame.
Figure 5:
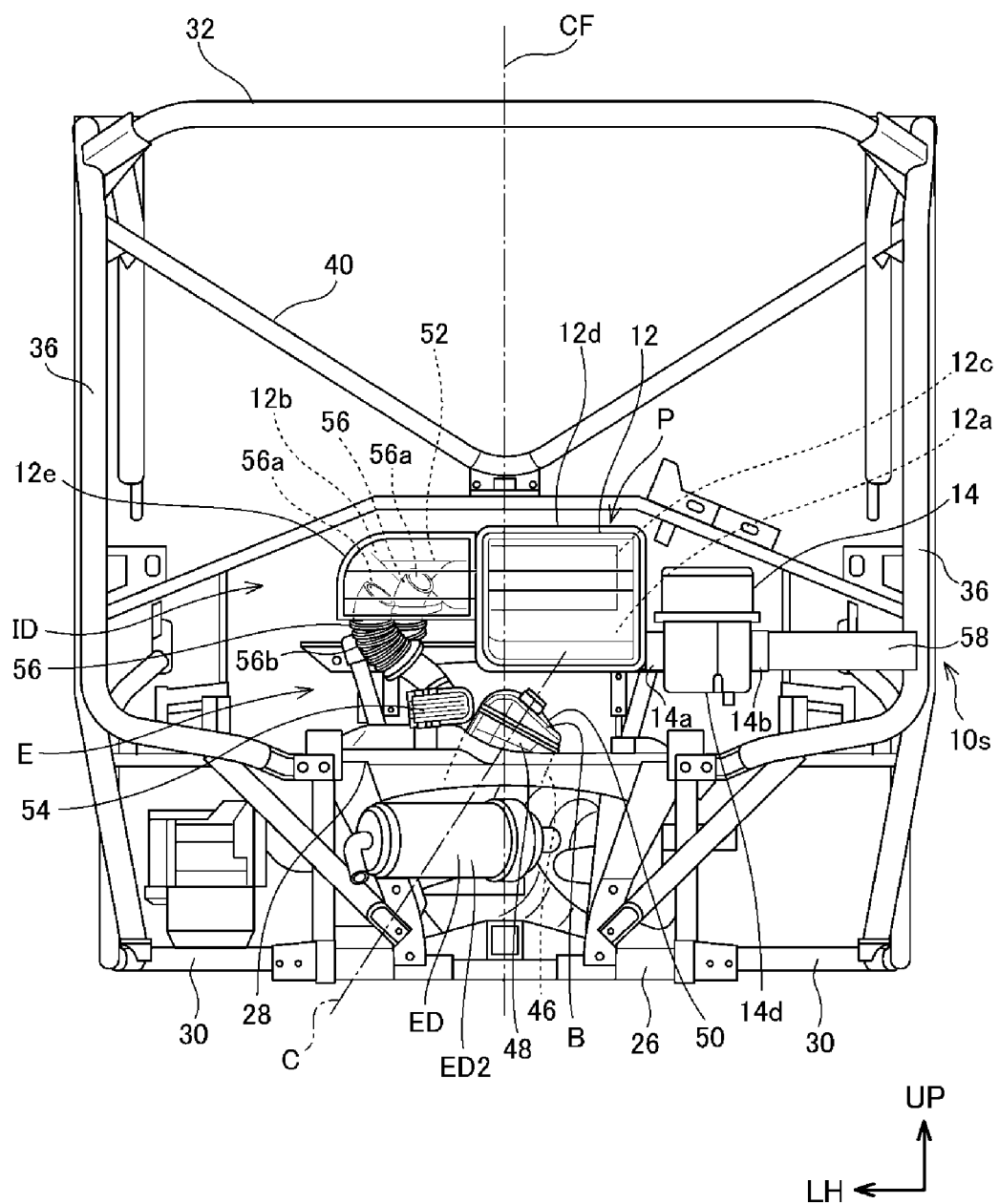
FIG. 5 is a rear view of a part of the internal combustion engine, including the air cleaners, and the vehicle body frame in the vehicle in FIG. 1 as viewed from the rear of the vehicle.
Figure 6:
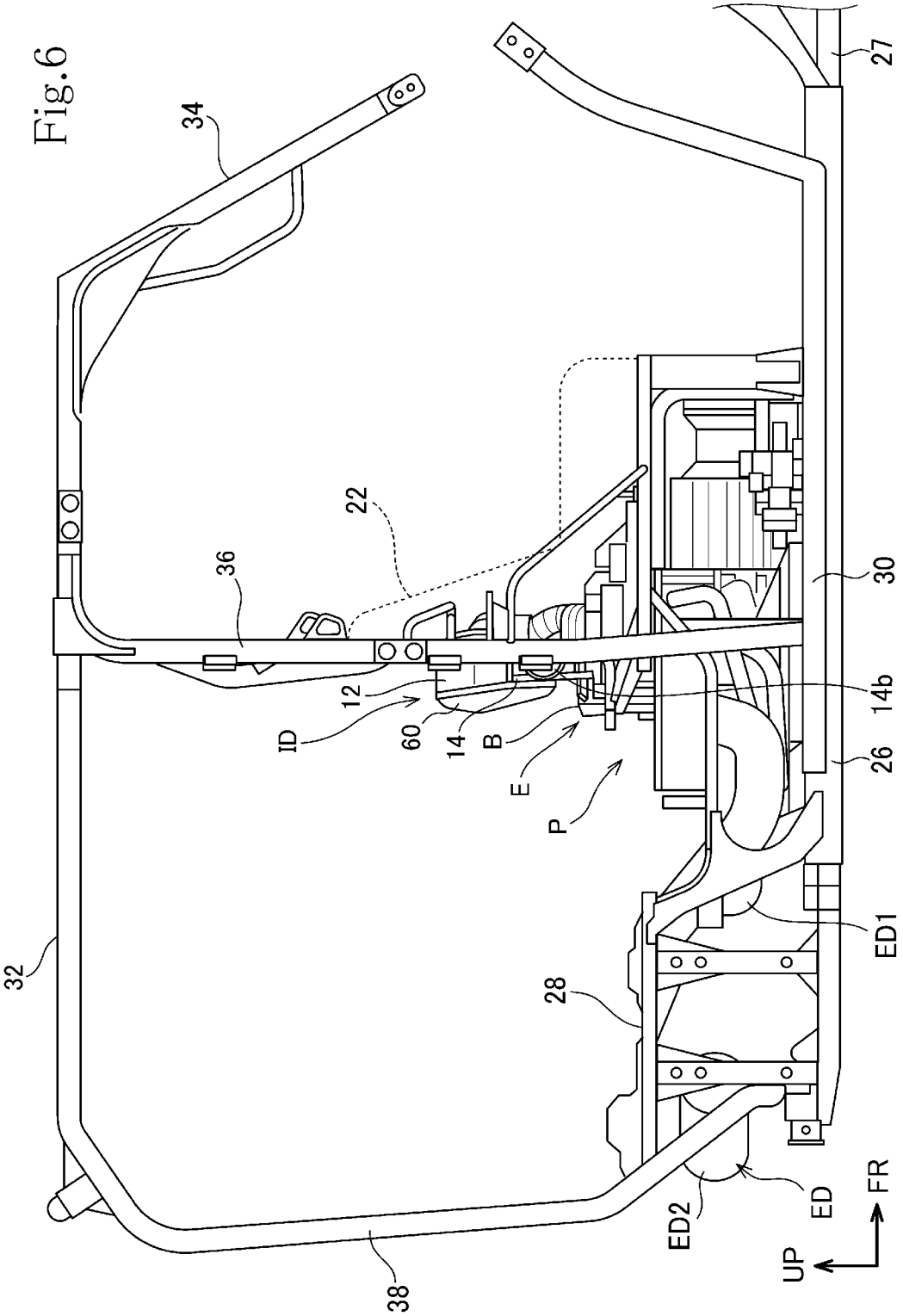
FIG. 6 is a right side view of a part of the internal combustion engine and the vehicle body frame in the vehicle in FIG. 1 as viewed from the right side.
Figure 7:
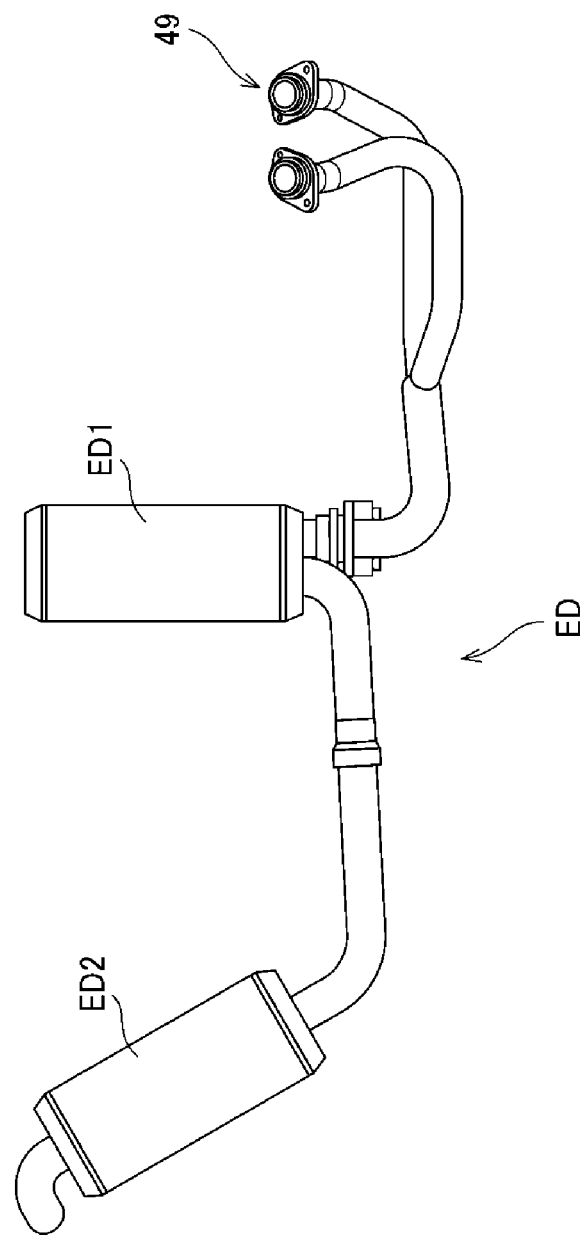
FIG. 7 is a top view of the exhaust device of the internal combustion engine alone in the state of being disposed in the vehicle in FIG. 1.

First, a vehicle 10 according to a first embodiment will be described with reference to FIGS. 1 to 7. FIG. 1 is a right side view of a vehicle 10, FIG. 2 is a perspective view of an intermediate portion of the vehicle 10 in the front-rear direction in FIG. 1 as viewed from behind and to the right of the portion, FIG. 3 is a perspective view of a cross section of an intermediate portion from which a cover member is removed and a periphery thereof in the vehicle 10 as viewed from behind and to the right of the portion, FIG. 4 is a perspective view of the surroundings of the air cleaners 12 and 14 in FIG. 3, mainly with respect to the vehicle body frame (hereinafter referred to as frame) 16, FIG. 5 is a rear view of a part of the internal combustion engine E, including the air cleaners 12 and 14, and the frame 16 in the vehicle in FIG. 1 as viewed from the rear of the vehicle, FIG. 6 is a right side view of a part of the internal combustion engine E and the frame 16 in the vehicle 10 as viewed from the right side, and FIG. 7 is a top view of the exhaust device ED of the internal combustion engine E alone in the state of being disposed in the vehicle 10. In the following description and drawings, the front-rear, left-right, and vertical directions are defined from the viewpoint of the driver in the vehicle 10, a code "FR" is used for the front in the front-rear direction, a code "LH" for the left in the left-right direction, that is, the vehicle width direction, and a code "UP" for the top in the up-down direction, that is, the vertical direction.

The vehicle 10 includes a frame 16 that serves as the framework of the vehicle 10, a pair of front wheels 18 supported at the front of the frame 16, and a pair of rear wheels 20 supported at the rear of the frame 16. The vehicle 10 is a so-called all-terrain vehicle, which is a multi-utility vehicle (MUV) that travels by supplying driving force to the front wheels 18 and rear wheels 20 through the operation of the engine main body B of the internal combustion engine E disposed near the center and at the bottom of the vehicle body in the front-rear direction as illustrated in FIGS. 5 and 6. In the vehicle 10, two occupants including the driver can ride side by side in the front seat 22 in the vehicle width direction. A cargo bed 24 is provided in the accommodating portion 25 provided behind the seat 22. Note that the cargo bed 24 is an example of the utilization of the accommodating portion 25 provided behind the seat 22; for example, a rear seat may be provided instead of the cargo bed 24.

As illustrated in FIGS. 5 and 6, the frame 16 includes a center frame portion (main frame portion) 26 connected to the rear of the front frame portion 27, and a rear frame portion 28 connected to the rear of the center frame portion 26. The frame 16 also includes a pair of left and right side frame portions 30 attached to the sides of the center frame portion 26, and an upper frame portion 32 attached so as to extend upward from the front frame portion 27, side frame portions 30, and rear frame portion 28. The front frame portion 27 supports the front wheels 18 via a front suspension. The rear frame portion 28 supports the rear wheels 20 via a rear suspension.

The upper frame portion 32 includes a pair of left and right front pillars 34 extending diagonally upward from the upper rear of the front frame portion 27, a pair of left and right center pillars 36 extending upward from the center of the side frame portion 30 in the front-rear direction, and a pair of left and right rear pillars 38 extending upward from the rear end of the rear frame portion 28. A cross pipe 40 is disposed between the left and right center pillars 36, and the center pillars 36 are connected to each other by the cross pipe 40. The cross pipe 40 is made mainly of a frame member made of a roll bar, that is, a roll bar frame member, and is an example of a reinforcing frame portion. The space surrounded by the front frame portion 27, side frame portion 30, center pillar 36, and upper frame portion 32 forms a cabin 42 in which occupants ride. In the cabin 42, the seat 22 is disposed, and a dashboard 43 is disposed in front of the seat 22. Various instruments such as a speed meter are mounted on the dashboard 43 (see FIG. 4).

In the cabin 42, a seat 22 is disposed between the front pillar 34 and the center pillar 36, and a pair of left and right front doors 44 that open and close by a front hinge mechanism is provided. In FIGS. 1 and 6, the seat 22 is indicated by a dashed line. As illustrated in FIG. 1, a rear cover 45 is provided so as to partition the rear of the cabin 42, that is, just behind the seat 22 in the cabin 42. The rear cover 45 is positioned immediately behind the cross pipe 40 in the front-rear direction, and extends generally flat in the vehicle width direction and vertical direction. The above-described cargo bed 24 is provided at the rear of the rear cover 45. The cargo bed 24 includes a rear hinge mechanism and is configured to be able to rise upward around the hinge mechanism (see FIG. 2).

In the vehicle 10, a power unit P is mounted on the frame 16 (see FIGS. 5 and 6). The power unit P includes a water-cooled four stroke cycle internal combustion engine E having two parallel cylinders and a transmission having a transmission shaft parallel to its crankshaft. The driving force of the internal combustion engine E is transmitted to the front wheels 18 and rear wheels 20 via the transmission as described above. In the present embodiment, the engine main body B is disposed on the frame 16 of the vehicle 10 such that the crankshaft extends in the front-rear direction of the vehicle, but the present invention does not limit the disposition of the engine main body B to this form.

The engine main body B of the internal combustion engine E is disposed substantially at the center in the front-rear direction. As is clear from FIGS. 1 to 6, the engine main body B is positioned behind the seat 22 in which the driver sits. The engine main body B of the internal combustion engine E is provided at the center frame portion 26, that is, the center pillar 36, in the front-rear direction, and at least a part of the engine main body B overlaps with the center pillar 36 in the side view (see FIG. 6). As illustrated in FIG. 5, when defining a center plane CF, which passes through the center of the vehicle 10 in the vehicle width direction, is orthogonal to the vehicle width direction, extends in the front-rear direction and in the vertical direction, this center plane CF intersects a cylinder head 48 of the engine main body B of the internal combustion engine E.

That is, in the vehicle 10, at least a part of the engine main body B is positioned behind the seat 22 and at the center in the vehicle width direction. As illustrated in FIGS. 5 and 6, the engine main body B of the internal combustion engine E is vertically disposed such that the cylinder axis C of the cylinder bore of the cylinder block 46 is slightly tilted to the right in the vehicle width direction but generally straight in the front-rear direction of the vehicle.

The engine main body B includes a cylinder block 46 with a cylinder bore formed above the crankcase that pivotally supports the crankshaft, and a cylinder head 48 and a cylinder head cover 50 are sequentially stacked above the cylinder block. An intake air system including air cleaners 12 and 14, that is, an intake device ID extends above the engine main body B, and an exhaust system, that is, an exhaust device ED extends behind the engine main body B. The engine main body B has its cylinder axis C tilted as described above, and the intake device ID is connected to the upper left of the cylinder head 48, and the exhaust device ED is connected to the lower right of the cylinder head 48.

As illustrated in FIG. 7, the exhaust device ED is a portion downstream of the connection 49 connected to the cylinder head 48 of the engine main body B, and includes a plurality of exhaust pipes and two chambers ED1 and ED2. As illustrated in FIG. 6, the first chamber ED1 and the second chamber ED2 are disposed in a rear frame portion 28 behind the engine main body B. Here, the first chamber ED1 includes a catalyst and is configured to function as an exhaust purification device, and the second chamber ED2 downstream in the exhaust flow direction from the first chamber ED1 is configured to function as a silencer, that is, a muffler. However, the number of chambers in the exhaust device ED, their use and configuration are not limited to this embodiment.

The following section mainly describes the intake device ID leading to the engine main body B of the internal combustion engine E.

In the intake device ID, the air cleaner 12 disposed relatively downstream (downstream in the intake air flow direction) in the intake passage 52 of the internal combustion engine E is referred to as the first air cleaner, and the air cleaner 14 disposed upstream of the first air cleaner 12 is referred to as the second air cleaner. Here, the first air cleaner 12 is larger than the second air cleaner 14, and the first air cleaner 12 may be referred to simply as the air cleaner and the second air cleaner 14 as the prefilter.

In the intake passage 52, the intake port of the cylinder head 48, the throttle body 54, the first air cleaner 12, and the second air cleaner 14 are positioned in order from downstream to upstream in the intake air flow direction, and a part of the intake passage 52 is defined and formed by each of them. The throttle body 54 and the first air cleaner 12 are connected by an intake pipe (hereinafter referred to as the first intake pipe) 56 which is an intake pipe member, the first air cleaner 12 and the second air cleaner 14 are directly connected to each other, and an intake introduction pipe 58, which is an intake pipe member, is connected to the upstream side of the second air cleaner 14, the intake introduction pipe 58 having an intake inlet to take in outside air. The first air cleaner 12 and the second air cleaner 14 are mechanically and directly connected here, but may be integrally configured from the beginning. By integrally configuring the first air cleaner 12 and the second air cleaner 14 from the beginning, the number of parts can be reduced and the parts cost can be reduced. Alternatively, a further intake pipe member connecting the first air cleaner 12 and the second air cleaner 14 may be used.

In the present embodiment, the engine main body B includes two cylinders and a first intake pipe 56 corresponding to each cylinder. That is, each of the two first intake pipes 56 is provided between the throttle body 54 and the first air cleaner 12, and connects them. The first intake pipe 56 includes a bellows-shaped pipe portion 56*b* having a bellows structure, but may not have a bellows structure. When a further intake pipe member is used to connect the first air cleaner 12 to the second air cleaner 14, the further intake pipe member may have a bellows-shaped pipe portion. FIGS. 4 and 5 show the first air cleaner 12 in perspective view.

The first intake pipe 56 connected to the throttle body 54 on the upper left side of the cylinder head 48 of the engine main body B extends upward from the throttle body 54 and is connected to the first air cleaner 12 positioned above, here, directly above, the engine main body B. The first air cleaner 12 includes a dirty side 12*a* positioned upstream in the intake air flow direction and a clean side 12*b* positioned downstream in the intake flow direction, and the dirty side 12*a* and the clean side 12*b* are partitioned by an air cleaner element 12*c*. In the first air cleaner 12, the dirty side 12*a* is positioned on the outer periphery of the air cleaner element 12*c*, which is substantially cylindrical, and in particular here the air cleaner element 12*c* is provided such that the dirty side 12*a* extends below the air cleaner element 12*c*, as illustrated in FIGS. 3 to 5, and the clean side 12*b* is positioned to the left of the air cleaner element 12*c*. Accordingly, the first air cleaner 12 is disposed such that the dirty side 12*a* and the clean side 12*b* are arranged side by side in the vehicle width direction. The upstream end portion 56*a* of the first intake pipe member 56 is inserted into the clean side 12b of the first air cleaner 12 from the bottom side to the top side.

The second air cleaner 14 is disposed on the side of the first air cleaner 12, here on the right side.

The second air cleaner 14 is directly connected to the dirty side 12a of the first air cleaner 12. The intake introduction pipe 58, which is connected to the upstream side of the second air cleaner 14, extends outside of the second air cleaner 14 in the vehicle width direction. Here, the intake introduction pipe 58 extends substantially straight outward from the second air cleaner 14 without substantially tilting in the front-rear direction at the vertical height of the dirty side 12a of the first air cleaner 12. The intake introduction pipe 58 extends inside the frame 16 to the vicinity of the side surface portion 10s of the vehicle 10, that is, the right side surface portion 10s, to a point where it does not reach the outside of the center pillar 36, which is a vertical frame portion extending vertically, or up and down, in the side surface portion 10s as illustrated in FIG. 5. The intake introduction pipe 58 may be referred to as the intake duct. The intake introduction pipe 58 may be fixed to the frame 16, for example, the center pillar 36 using a connecting member or the like.

The second air cleaner 14 is a box-shaped member and has a connection between the first air cleaner 12 and the second air cleaner 14, or a downstream connection 14a, and a connection with the intake introduction pipe 58, or an upstream connection 14b, at a position spaced apart upward from the lower bottom portion 14d. The second air cleaner 14 defines and forms a passage extension in the intake passage 52, and has a wider cross-sectional area than the cross-sectional area of the flow path of the downstream connection 14a and the upstream connection 14b. Therefore, the second air cleaner 14 can function to separate sand, dust, and the like contained in the intake air that flows into it. The second air cleaner 14 may include an air cleaner element.

The first air cleaner 12 and the second air cleaner 14 are covered by a cleaner cover 60, which is a case member. FIG. 2 illustrates the cleaner cover 60 positioned between the center pillars 36 with the cargo bed 24 lifted, and FIG. 3 illustrates the first air cleaner 12 and the second air cleaner 14 with the case member cleaner cover 60, which is a case member, open and the rear case inside the cleaner cover 60 removed. In FIG. 3, however, the first air cleaner 12 and the second air cleaner 14 are illustrated in sectional views. Here, the first air cleaner 12 is disposed in a narrow area directly below the cross pipe 40 and directly above the engine main body B. The cleaner cover 60 is provided to protect the first air cleaner 12 and the second air cleaner 14, particularly the first air cleaner 12, from heat of the engine main body B. However, the hole portion 60a in the cleaner cover 60 in FIG. 2 is the hole through which the intake introduction pipe 58 is inserted, and the cleaner cover 60 is omitted in FIGS. 4 to 6, and the intake introduction pipe 58 is omitted in FIGS. 2, 3 and 6.

As illustrated in FIG. 5, the center plane CF intersects with the first air cleaner 12. Accordingly, at least a part of the first air cleaner 12 is positioned at the center in the vehicle width direction. As described above, the first air cleaner 12 is positioned above, here directly above, the engine main body B of the internal combustion engine E. In addition, the first air cleaner 12 is positioned below the cross pipe 40, here directly below the cross pipe 40. Accordingly, as illustrated in FIGS. 3 to 6, at least a part of the first air cleaner 12 overlaps with the cross pipe 40, which is a reinforcing frame portion in the vehicle front-rear direction.

The second air cleaner 14 is positioned lateral to the first air cleaner 12 in the vehicle width direction, here alongside the right side of it. Since the center plane CF intersects with the first air cleaner 12, the second air cleaner 14 is positioned outside the first air cleaner 12 in the vehicle width direction. However, the second air cleaner 14 is disposed inside the frame 16, particularly inside the center pillar 36 of the upper frame portion 32 of the frame 16, which constitutes the outer frame of the vehicle 10. As apparent from FIG. 5, the second air cleaner 14 is disposed outside the engine main body B in the vehicle width direction. As described above, the second air cleaner 14 is disposed alongside the right side of the first air cleaner 12, so that at least a part of the second air cleaner 14, particularly here most of the second air cleaner 14 overlaps with the first air cleaner 12 in the vehicle front-rear direction.

The second air cleaner 14 is connected to the dirty side partitioned 12b by the air cleaner element 12c in the first air cleaner 12 from the clean side. Since the second air cleaner 14 is disposed outside the first air cleaner 12 in the vehicle width direction, the dirty side 12a faces the side surface portion 10s of the vehicle 10.

The characteristic configuration and its effect or action with respect to the vehicle 10 having the above configuration are described below.

In the vehicle 10, the engine main body B of the internal combustion engine E is positioned behind the seat 22 on which the occupant sits, and at least a part thereof is positioned at the center in the vehicle width direction. The first air cleaner 12, which defines and forms a part of the intake passage 52 of the internal combustion engine E, is positioned above the engine main body B. Furthermore, the second air cleaner 14, which is positioned upstream of the first air cleaner 12 to define and form a part of the intake passage 52 of the internal combustion engine E, is positioned outside the first air cleaner 12 in the vehicle width direction. The above configuration can, for example, shorten the length of the first intake pipe 56 connecting the first air cleaner 12 to the throttle body 54, compared to the case where the air cleaner is positioned in the front area in front of the dashboard in front of the front seat, as in the vehicle of Patent Document 1. This reduces the cost or labor of arrangement of the intake pipe members including the first intake pipe 56.

The second air cleaner 14 is disposed inside the frame 16 that constitutes the outer frame of the vehicle 10 and outside the engine main body B in the vehicle width direction. This improves accessibility to the second air cleaner and enhances the workability of its maintenance. Furthermore, in the first air cleaner 12, the dirty side 12a faces the side surface portion of the vehicle 10, here the right side surface portion 10s of the vehicle 10. An upstream portion 12d of the dirty side 12a side of the first air cleaner 12, which includes the air cleaner element 12c, is configured separately from and connected to a downstream portion 12e of the clean side 12b (see FIG. 3). This improves accessibility to the upstream portion 12d on the dirty side 12a side of the first air cleaner 12, so that the upstream portion 12d can be easily removed to replace, for example, the air cleaner element 12c during maintenance.

The intake introduction pipe 58, which is an intake pipe member that connects upstream of the second air cleaner 14, extends outside of the second air cleaner 14 in the vehicle width direction. More specifically, the intake introduction pipe 58 extends to a point that not reach the outside of the center pillar 36 and extends inside the frame 16. This configuration allows the intake air to be suitably directed to the second air cleaner 14 even when the second air cleaner 14 is provided relatively inside the vehicle 10.

Furthermore, at least a part of the second air cleaner 14 overlaps with the first air cleaner 12 in the vehicle front-rear direction. At least a part of the first air cleaner 12 and the second air cleaner 14 overlap with the cross pipe 40, which is a reinforcing frame portion, in the vehicle front-rear direction. This configuration allows the first air cleaner 12 and the second air cleaner 14 to be compactly disposed in a small space behind the seat 22 and in front of the cargo bed 24.

The first intake pipe 56 connecting the throttle body 54 and the first air cleaner 12 includes a bellows-shaped pipe portion 56b. This configuration allows the first intake pipe 56 to be easily bent at a large curvature, making it easier to position the first air cleaner 12 closer to the engine main body B. Also, by configuring the first intake pipe 56 with a bellows-shaped pipe portion 56b, the vibration of the vehicle 10 and/or the engine main body B can be absorbed to some extent by the first intake pipe 56, which can further prevent defects in the first air cleaner 12 and others. The same applies to a case where an intake pipe including a bellows-shaped pipe portion is used between the first air cleaner 12 and the second air cleaner 14, in which case vibration can be absorbed by that bellows-shaped pipe portion to maintain a more suitable connection between the first air cleaner 12 and the second air cleaner 14, for example.

Furthermore, by covering the first air cleaner 12 and the second air cleaner 14 with the cleaner cover 60, which is a case member, the first air cleaner 12 and the second air cleaner 14, particularly the first air cleaner 12, can be protected from heat of the engine main body B.

Figure 8:
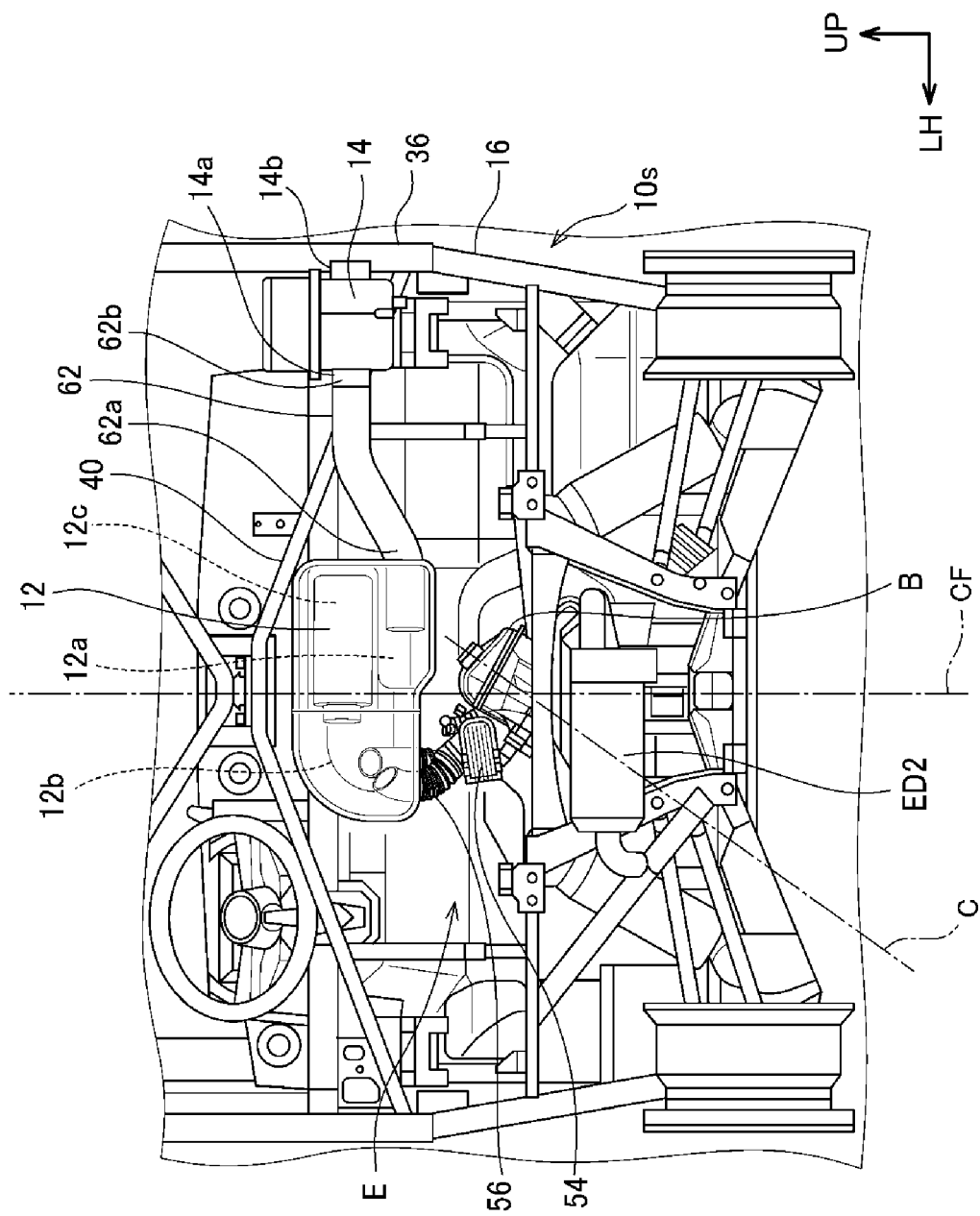
FIG. 8 is a rear view of the vehicle according to the second embodiment of the present invention as viewed from the rear of the vehicle, illustrating the area around the air cleaner with respect to the vehicle body frame.
Figure 9:
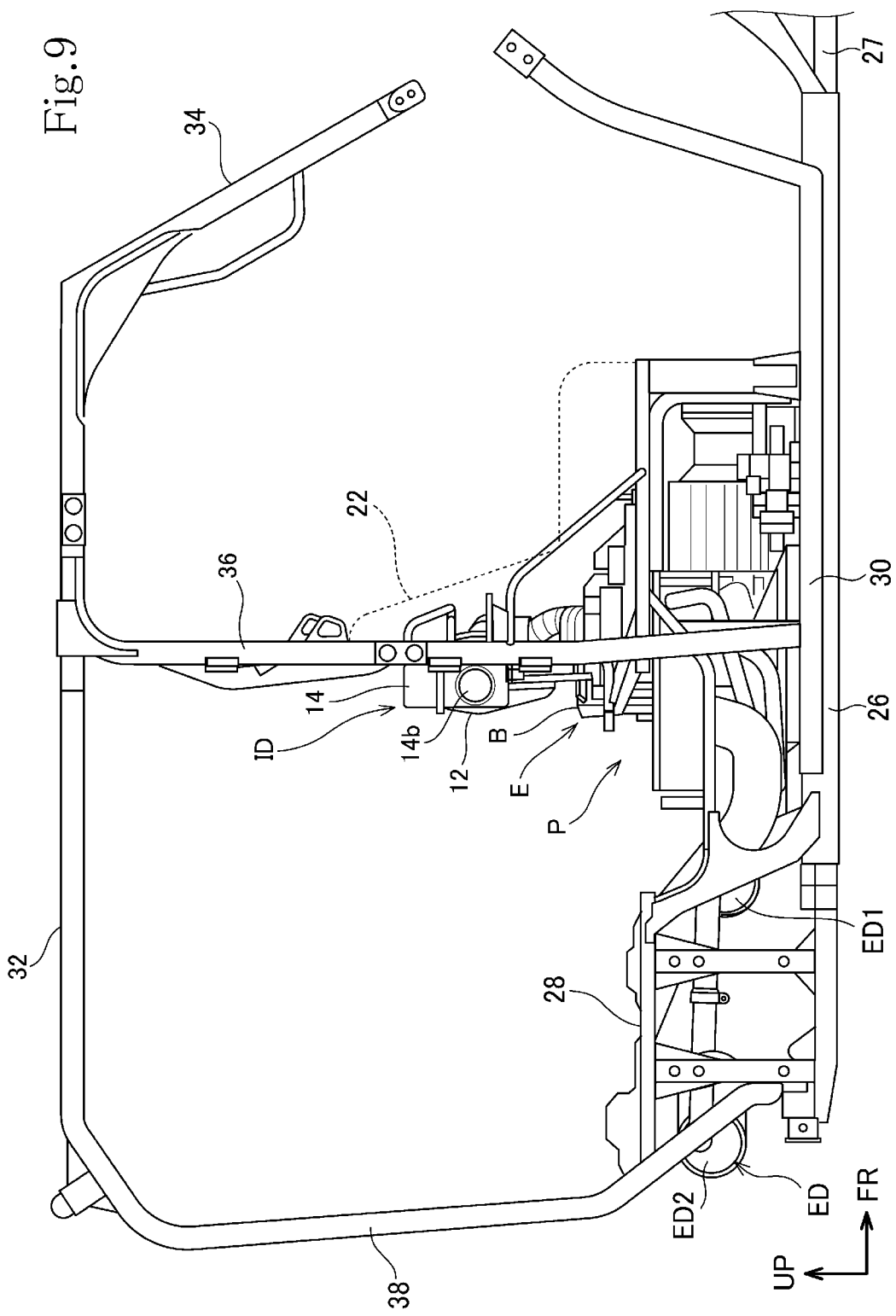
FIG. 9 is a right side view of a part of the internal combustion engine and the vehicle body frame in the vehicle according to the second embodiment as viewed from the right side.

The next section describes the second embodiment of the present invention based on FIGS. 8 and 9. In the following, only the differences in the vehicle according to the second embodiment from the vehicle 10 according to the first embodiment will be described. Unless otherwise specified, the configurations that are omitted from the description with respect to the second embodiment of the vehicle are the same as or differ only slightly from the configurations of the vehicle 10. In the present specification and the drawings, components corresponding to those already described are similarly marked with the codes already used, and their redundant descriptions are omitted.

In the vehicle according to the second embodiment, the second air cleaner 14 is disposed inside the frame 16 and in the vicinity of the side surface portion 10s of the vehicle 10. The second air cleaner 14 is disposed in the vicinity of the center pillar 36, which is a vertical frame portion of the frame 16. The upstream connection 14b of the second air cleaner 14 serves as an intake inlet. Then, an intake pipe member (hereinafter referred to as the second intake pipe) 62 that connects the first air cleaner 12 on the center plane CF and the second air cleaner 14 away from the first air cleaner 12 is used. This makes it possible to remove sand or the like contained in the intake air flowing into the intake passage 52 from the upstream connection of the second air cleaner 14, or the intake inlet 14b, from the intake air at the second air cleaner 14 positioned more upstream. In this case, the second air cleaner 14 is closer to the side surface portion 10s, which improves accessibility to the second air cleaner 14 and makes maintenance easier. In this case, the second air cleaner 14 is preferably fixed to the center pillar 36 using a connecting member or the like.

The second intake pipe 62 extends in the vehicle width direction, and is slightly curved so as to be positioned slightly higher in the vertical direction at the connection 62b side with the second air cleaner 14 than at the connection 62a side with the first air cleaner 12. The second intake pipe 62 may include a pipe portion having a bellows structure, that is, a bellows-shaped pipe portion.

The second air cleaner 14 is positioned slightly behind the second air cleaner 14 of the vehicle 10 in order to avoid interference with the cross pipe 40. However, as illustrated in FIG. 9, the rearward displacement of the second air cleaner 14 is within the range where at least a part of the second air cleaner 14 overlaps with the first air cleaner 12 in the vehicle front-rear direction. Accordingly, even with this disposition of the second air cleaner 14, compactness is possible.

Figure 10:
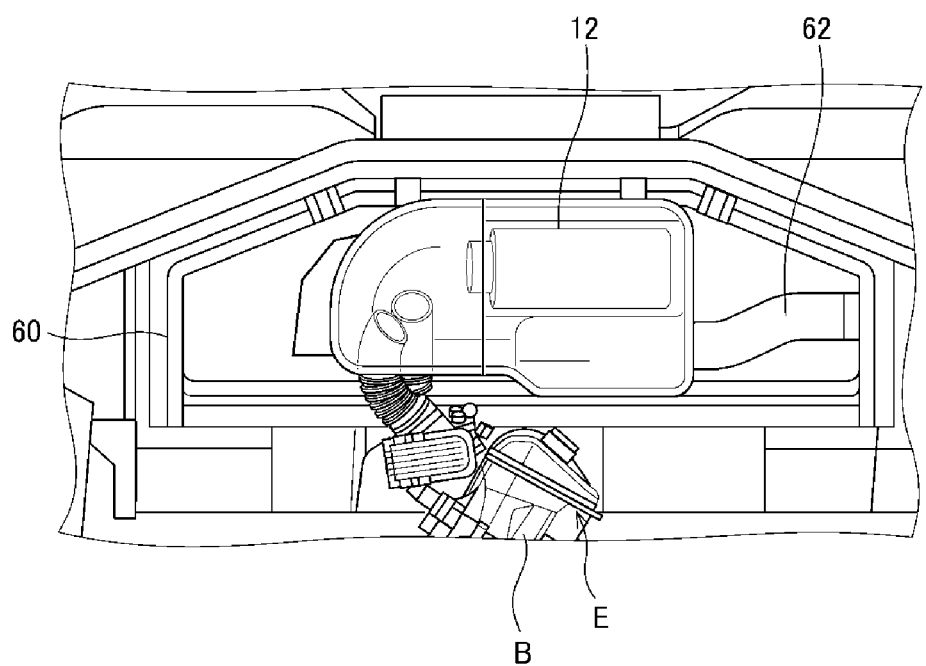
FIG. 10 is a rear view illustrating a modification in which the surroundings of the first air cleaner in FIG. 8 are covered with a cover member.

By separating the second air cleaner 14 from the first air cleaner 12 in this manner, the second air cleaner 14 is separated from the engine main body B. Therefore, the second air cleaner 14 can be more suitably prevented from being affected by the heat of the engine main body B. In this case, as illustrated in FIG. 10, only the first air cleaner 12 is preferably covered by the cleaner cover 60, which is a case member.

The embodiment of the present invention and the modified example thereof have been described above, but the present invention is not limited thereto. Various substitutions and changes may be made without departing from the spirit and scope of the present invention as defined by the claims of the present application. The processing and means described in the present disclosure may be freely combined and implemented as long as no technical contradiction occurs.

REFERENCE SIGNS LIST

10 Vehicle
12 First air cleaner
14 Second air cleaner
16 Vehicle body frame
36 Center pillar
40 Cross pipe
56b Bellows-shaped pipe portion
E Internal combustion engine
B Engine main body

The invention claimed is:

1. A vehicle comprising an internal combustion engine, comprising:
   an engine main body positioned behind a seat and at least partially in the center of the vehicle width direction;
   a first air cleaner positioned above the engine main body so as to define and form a part of an intake passage of the internal combustion engine; and
   a second air cleaner disposed upstream of the first air cleaner so as to define and form a part of the intake passage,
   wherein the second air cleaner is positioned outside the first air cleaner in the vehicle width direction, and
   wherein the first air cleaner and the second air cleaner are arranged in the vehicle width direction, at least a part of the first air cleaner and the second air cleaner overlap with a cross pipe which constitutes a reinforcing frame portion of the vehicle in the vehicle front-rear direction.

2. The vehicle according to claim 1, comprising
   a frame constituting the outer frame of the vehicle,
   wherein the second air cleaner is disposed inside the frame and in the vicinity of a side surface portion of the vehicle.

3. The vehicle according to claim 1,
wherein an intake pipe member is connected to the upstream side of the second air cleaner, and
the intake pipe member extends outside of the second air cleaner in the vehicle width direction.

4. The vehicle according to claim 1,
wherein the first air cleaner is further covered by a case member.

5. The vehicle according to claim 1,
wherein at least a part of the second air cleaner overlaps with the first air cleaner in the vehicle front-rear direction.

6. The vehicle according to claim 1, further comprising:
a accommodating portion provided behind the seat;
wherein the reinforcing frame portion positioned between the accommodating portion and the seat in the vehicle front-rear direction, and
wherein at least a part of the first air cleaner and the second air cleaner overlaps with the reinforcing frame portion in the vehicle front-rear direction.

7. The vehicle according to claim 6,
wherein the reinforcing frame portion comprises a roll bar frame member.

8. The vehicle according to claim 1,
wherein the first air cleaner has a clean side and a dirty side partitioned by an air cleaner element,
the dirty side facing the side surface portion of the vehicle.

9. The vehicle according to claim 1,
wherein at least one of a first intake pipe connecting the engine main body and the first air cleaner and a second intake pipe connecting the first air cleaner and the second air cleaner comprise a bellows-shaped pipe portion.

10. The vehicle according to claim 1,
wherein the second air cleaner is integrally configured with the first air cleaner.

* * * * *